US009637420B2

(12) United States Patent
McKnight et al.

(10) Patent No.: US 9,637,420 B2
(45) Date of Patent: May 2, 2017

(54) INCREASED LONGEVITY OF THE NITROGEN CONTENT OF SOIL THROUGH IMPROVED LIQUID DELIVERY FORMULATIONS OF UREASE INHIBITORS AND/OR NITRIFICATION INHIBITORS DESIGNED FOR UREA AND MANURE BASED FERTILIZERS

(71) Applicants: Gary David McKnight, High Point, NC (US); Randall Linwood Rayborn, Burlington, NC (US); David Bruce Parker, Canyon, TX (US); Wei Xu, Sugarland, TX (US); Zehui Yang, Ningbo (CN); Raymond Patrick Perkins, Tierra Verde, FL (US); Andrew Michael Semple, Bradenton, FL (US)

(72) Inventors: Gary David McKnight, High Point, NC (US); Randall Linwood Rayborn, Burlington, NC (US); David Bruce Parker, Canyon, TX (US); Wei Xu, Sugarland, TX (US); Zehui Yang, Ningbo (CN); Raymond Patrick Perkins, Tierra Verde, FL (US); Andrew Michael Semple, Bradenton, FL (US)

(73) Assignee: Eco World Research and Development Group, LLC

( * ) Notice: Subject to any disclaimer, the term of this patent is extended or adjusted under 35 U.S.C. 154(b) by 0 days.

(21) Appl. No.: 14/553,107

(22) Filed: Nov. 25, 2014

(65) Prior Publication Data

US 2015/0143860 A1    May 28, 2015

Related U.S. Application Data

(60) Provisional application No. 61/909,129, filed on Nov. 26, 2013.

(51) Int. Cl.
*C05C 9/00* (2006.01)
*C05G 3/08* (2006.01)
(Continued)

(52) U.S. Cl.
CPC .................. *C05G 3/08* (2013.01); *C05C 9/00* (2013.01); *C05D 9/02* (2013.01); *C09K 15/28* (2013.01);
(Continued)

(58) Field of Classification Search
CPC ....................................................... C05C 9/00
See application file for complete search history.

(56) References Cited

U.S. PATENT DOCUMENTS 3,152,039 A    10/1964 Mattson
3,353,949 A    11/1967 Nau
(Continued)

FOREIGN PATENT DOCUMENTS

CN    101391919    *    3/2009
GB    1371694 A    2/1972
(Continued)

OTHER PUBLICATIONS

Prosecution history of PCT Application No. PCT/US2014/67453.
(Continued)

*Primary Examiner* — Wayne Langel
(74) *Attorney, Agent, or Firm* — Ben Schroeder Law, PLLC (57) ABSTRACT

Increasing longevity of the nitrogen content of soil through improved liquid delivery formulations of urease inhibitors and/or nitrification inhibitors designed to apply to fertilizers, especially urea and manure based fertilizers These delivery formulations provide an environmentally sound and inherently safe solvating system that improves the storage stability of the urease inhibitors by utilizing aprotic solvents,
(Continued)

maintain the urease inhibitors and/or nitrification inhibitors in solution to storage temperatures of at least 10° C. and provides improved application to fertilizer of urease and/or nitrification inhibitors. These delivery formulations enable safe storage, transport and subsequent application or blending with urea based or manure based fertilizers that can be applied to soil in either a liquid or granular form to provide improved nitrogen retention in the soil for uptake for plant life.

18 Claims, 1 Drawing Sheet

(51) Int. Cl.
  C09K 15/28 (2006.01)
  C05D 9/02 (2006.01)
  C05F 3/00 (2006.01)
(52) U.S. Cl.
  CPC ............ C05F 3/00 (2013.01); Y02P 20/145 (2015.11); Y02P 60/218 (2015.11)

(56) References Cited

U.S. PATENT DOCUMENTS

| | | |
|---|---|---|
| 3,425,819 A | 2/1969 | Barry et al. |
| 3,986,859 A | 10/1976 | Molinet |
| 4,234,332 A | 11/1980 | Michaud |
| 4,294,604 A | 10/1981 | Evrard |
| 4,517,003 A | 5/1985 | Kolc et al. |
| 4,530,714 A | 7/1985 | Kolc et al. |
| 4,943,307 A | 7/1990 | Detre et al. |
| 5,024,689 A | 6/1991 | Sutton et al. |
| 5,071,463 A | 12/1991 | Narayanan et al. |
| 5,106,984 A | 4/1992 | Halpen |
| 5,160,528 A | 11/1992 | Chaudhuri et al. |
| 5,352,265 A | 10/1994 | Weston et al. |
| 5,354,726 A | 10/1994 | Narayanan et al. |
| 5,364,438 A | 11/1994 | Weston et al. |
| 5,435,821 A | 7/1995 | Duvdevani et al. |
| 5,698,003 A | 12/1997 | Omilinsky et al. |
| 6,262,183 B1 | 7/2001 | Domb et al. |
| 6,488,734 B1 | 12/2002 | Barth |
| 6,830,603 B2 | 12/2004 | Whitehurst et al. |
| 7,615,232 B2 | 11/2009 | Wurtz et al. |
| 8,048,189 B2 | 11/2011 | Whitehurst et al. |
| 8,133,294 B2 | 3/2012 | Whitehurst et al. |
| 8,562,711 B2 | 10/2013 | Sutton et al. |
| 9,056,804 B2 | 6/2015 | Phillip et al. |
| 2003/0211943 A1 | 11/2003 | Harwell |
| 2004/0163434 A1 | 8/2004 | Quin |
| 2006/0185411 A1 | 8/2006 | Hojjatie et al. |
| 2007/0077428 A1 | 4/2007 | Hamed et al. |
| 2007/0157689 A1 | 7/2007 | Sutton et al. |
| 2007/0295047 A1 | 12/2007 | Sutton |
| 2008/0070871 A1 | 3/2008 | Hucke et al. |
| 2010/0206330 A1 | 8/2010 | Flook |
| 2010/0248334 A1 | 9/2010 | McDaniel |
| 2011/0015076 A1 | 1/2011 | Angst et al. |
| 2011/0154874 A1 | 6/2011 | Rahn et al. |
| 2011/0233474 A1 | 9/2011 | Cigler et al. |
| 2011/0259368 A1 | 10/2011 | Hofte et al. |
| 2011/0314383 A1 | 12/2011 | Abdo et al. |
| 2013/0125321 A1 | 5/2013 | Newbould et al. |
| 2013/0252960 A1 | 9/2013 | Brewster et al. |
| 2014/0090432 A1* | 4/2014 | McKnight ............ C05G 3/0041 71/28 |
| 2014/0174140 A1* | 6/2014 | Ortiz-Suarez ............ C05G 3/08 71/27 |

FOREIGN PATENT DOCUMENTS

| | | |
|---|---|---|
| NZ | 586790 A | 6/2012 |
| WO | 2005/075602 A1 | 8/2005 |
| WO | 2008/000196 | 1/2008 |
| WO | WO 2008/000196 | 1/2008 |
| WO | 2013/071344 | 5/2013 |
| WO | 2013/090324 | 6/2013 |

OTHER PUBLICATIONS

Prosecution history of U.S. Appl. No. 13/890,082 and all references cited/considered therein.
International Search report and Written Opinion for PCT/US2014/67453 issued Feb. 6, 2015 and references cited therein.
International Preliminary Report on Patentability for PCT/US2014/67453 issued May 31, 2016.
Declaration of Willis I Thornsberry dated Feb. 21, 1967.
Prosecution history of PCT Application No. PCT/US2013/40199.
International Preliminary Report on Patentability for PCT/US2014167453 issued May 31, 2016.

* cited by examiner

INCREASED LONGEVITY OF THE NITROGEN CONTENT OF SOIL THROUGH IMPROVED LIQUID DELIVERY FORMULATIONS OF UREASE INHIBITORS AND/OR NITRIFICATION INHIBITORS DESIGNED FOR UREA AND MANURE BASED FERTILIZERS

This application claims priority under 35 USC 119(e) to U.S. Provisional Application No. 61/909,129 filed Nov. 26, 2013, the contents of which are incorporated by reference in its entirety.

FIELD OF INVENTION

The present invention relates to increasing and/or maintaining nitrogen content in soil by administration of an improved liquid formulation. In one embodiment, the liquid formulation comprises urease inhibitors and/or nitrification inhibitors. In an embodiment, the liquid formulations are designed to be used in conjunction with urea and/or manure based fertilizers.

BACKGROUND OF THE INVENTION

Agriculture currently utilizes fertilizers to deliver the needed nutrients of nitrogen, phosphorus, potassium, sulfur, calcium, and magnesium to plants through the application of fertilizers to the soil. Nitrogen generally is the most yield-limiting and costly nutrient element in crop production. Fertilizers are based on nitrogen content, mainly urea and additional plant nutrients and additives. Fertilizers can either be formulated as man-made products or natural organic based animal manure. Nitrogen is the primary nutrient in fertilizers and urea is the primary nitrogen source in fertilizers. Thus, fertilizers have become one vehicle for increasing the nitrogen content in the soil to assist in maintaining the health, overall quality, growth and yields of many of the plants important to agriculture and to civilization. Nitrogen is usually formulated into fertilizer by one or more of urea and/or ammonium nitrate and for ammonium sulfate and/or manure and/or ammonium phosphate and/or the like.

Generally, the fertilizer is applied to the soil as either a liquid or a solid. Maintaining a sufficient level of nitrogen concentration in the soil proves difficult over time due to nitrogen and nitrogen containing compounds (such as urea) solubilities in water. When rain or water run-off contacts the soil, the nitrogen or nitrogen containing compounds may be carried with the water to surrounding water-ways.

Alternatively, the degradation of nitrogen content may be attributed to volatilization (such as for ammonia and $NO_x$ where x is 1, 2 or 3) and water runoff due to the better water solubility of nitrites/nitrates. Loss due to volatilization is sometimes driven by a urease enzyme that catalyzes hydrolysis of urea to ammonia and carbon dioxide and to the biological oxidation of $NH_3$ or $NH_4$ to $NO_x$'s such as nitric oxide, an atmospheric greenhouse gas which, on a molecular basis, has 310 times the global warming potential of carbon dioxide. This results in a substantial loss of nitrogen content in the fertilizer impacting costs to the farmer. Moreover, the loss of nitrogen from the soil results not only in water pollution but also atmospheric pollution.

Nitrogen in the soil is also lost by the attack of nitrogen and nitrogen containing compounds (such as urea) by enzymes like the urease enzyme. Attack by the urease enzyme causes urea to degrade to carbon dioxide and ammonia. Biological oxidations by soil microbes, such as Nitrosomonas bacteria, of ammoniacal nitrogen to nitrate nitrogen are also a cause of the diminishing nitrogen content in soil over time. While the conversion of urea to ammonia and oxidation of ammonia to nitrates within the soil is beneficial to plants, conversions occurring on top of the soil, where fertilizers are applied, also results in a loss of nitrogen. To improve the longevity of nitrogen in the soil, fertilizers have been treated with urease inhibitors and nitrification inhibitors. These inhibitors are usually imparted onto the surface of fertilizer granules or added to liquid fertilizers through an aqueous solution.

Thus, it is desired that one increase the life expectancy of nitrogen in the soil to insure more consistent levels of nitrogen during the growing season while also decreasing the number of times the fertilizer is applied to the soil. Increasing the life expectancy of nitrogen in soil while simultaneously decreasing the number of applications of fertilizer will lower the overall cost to the agriculture industry while at the same time limiting the amount of nitrogen carried into the waterways. The present methods that are used create polluting conditions that are believed to have fueled the formation of the Gulf Dead Zone, the formation of toxic algal blooms as well as damage to drinking water supplies. Thus, finding delivery formulations that are safe for the environment and for animals and that contain the proper levels of urease inhibitors and/or nitrification inhibitors that may be applied directly to the soil in a liquid form or imparted onto fertilizer granules as a one-step application would be advantageous to the agricultural industry. Such a treated fertilizer would also assist in slowing two major biological processes that cause substantial loss of nitrogen in soil while simultaneously assisting in controlling pollution of our water and atmosphere.

(2) DESCRIPTION OF THE RELATED ART

Various methods have been proposed and developed for controlling volatile nitrogen loses from urea.

N-(n-butyl)-thiophosphoric triamide (NBPT) is a known urease inhibitor described by Kolc et. al. (U.S. Pat. No. 4,530,714). The compound is a waxy solid with poor water solubility. The compound undergoes hydrolysis and is thermally unstable. The '714 patent describes the mixing of NBPT with organic solvents (acetone, diisobutylketone, methanol, ethanol, 2-propanol, diethyl ether. toluene, or methylene chloride) to distribute the compound into the soil in an effective concentration range which can be anywhere from 5 ppm to 100 ppm depending upon the soil.

Omilinsky et. al. (U.S. Pat. No. 5,698,003) describes the dissolution of NBPT with glycol such as propylene glycol or ethylene glycol and esters of glycols. Glycols are compounds with adjacent alcohol groups in the chemical structure. The dissolution may contain a co-solvent liquid amid such as N-methyl-2-pyrrolidine and potentially a surfactant or dispersing agent such as polyethylene glycol or esters of poly-ethylene glycol (polyether alcohols). Esters of glycerol may be used as the base solvent.

Weston et. al (U.S. Pat. Nos. 5,352,265 and 5,364,438) teach the dissolution of NBPT in liquid amides such as 2-pyrrolidone or N-alkyl-2-pyrrolidones and in particular as N-methyl-2-pyrrolidone to prepare both solid urea formulations ('265 patent) or liquid formulations ('438 patent).

Hojjatie et. al. (US Patent Application Publication No. 2006/0185411) teach the use of a number of sulfur salts of calcium or magnesium (calcium polysulfide, thiosulfate, and magnesium thiosulfate) as urease inhibitors to prepare granular or liquid urea compositions.

Quin (US Patent Application Publication No. 2004/0163434) teaches the formation of a sulfur coated urea which may contain the urease inhibitor NBPT supplied from a proprietary liquid formulation sold as Agrotain and distributed by Agrotain International LLC, Indiana, USA.

Sutton et. al. (U.S. Pat. No. 5,024,689) teach the use of liquid fertilizer that includes urease inhibitors such as NBPT and nitrification inhibitor such as dicyandiamide in aqueous mixtures of urea, ammonium polyphosphate, ammonium thiosulfate and potentially other plant growth improving compounds.

Sutton (U.S. Pat. No. 8,562,711) provides a method for developing a dry, flowable additive for aqueous urea-based fertilizers based on solid urea formaldehyde polymer, N-(n-butyl)thiophosphoric triamide), and, optionally, dicyandiamide that imparts reduced nitrogen loss from the soil. Also, Sutton provides that the dry additive may be blended with molten or solid urea to form a solid urea-based fertilizer with reduced nitrogen loss from the soil.

Sutton (US Patent Application Publication No. 2007/0295047) teaches the formation of a solid fertilizer comprised of urea and a urea-formaldehyde polymer which may additionally include a urease inhibitor such as NBPT.

Sutton et. al. (US Patent Application Publication No. 2007/0157689) describe a fertilizer additive composed of urea, a urea-formaldehyde polymer and NBPT dissolved in an N-alkyl-2-pyrrolidone.

Whitehurst et. al. (U.S. Pat. No. 6,830,603) describe an application methodology wherein a boron containing urease inhibitor composition may be used to add additional nutrients such as phosphate, potassium, etc. to a fertilizer. The application of urea with other materials is described and the references in Whitehurst et. al. ('603 patent) provide a partial summary of related art in the area. The inhibitors and binders described are aqueous mixtures that include ethanolamine borates, diethanolamine borates or triethanolamine borates and mixtures of these.

Whitehurst et. al. (U.S. Pat. No. 8,133,294) describe preparation of a solution of NBPT by dissolving N-(n-butyl)-thiophosphoric triamide (NBPT) in a solution of a mixture of amino alcohols such as ethanolamine, diethanolamine, triethanolamine, monoethanolamine and diisopropylamine buffered with a carboxylic acid such as acetic acid, propionic acid, butyric acid, valeric acid and caprioic acid that can be used to prepare coated urea products that would include other nutrients such as potassium chloride, potassium salts and salts of iron, copper, zinc, manganese and others.

The use of nitrification inhibitors can also be used to diminish the disappearance of nitrogen from soils. Barth (U.S. Pat. No. 6,488,734) introduces the concept of the use of polyacids, which contain nitrification inhibitors, and pyrazole derivatives for the treatment of inorganic fertilizers;

Halpern (U.S. Pat. No. 5,106,984) shows how to prepare 1,1-dichloro-2-propanone and acrylonitrile by the formation and further reaction of 4,4-dichloro-5-oxo-hexanenitrile, which are utilized as herbicides and nitrification inhibitor.

Evrard (U.S. Pat. No. 4,294,604) discloses the use of selected N-(2,6-dimethylphenyl)-alanine methyl ester compounds as ammonium nitrification inhibitors.

Michaud (U.S. Pat. No. 4,234,332) describes aqueous solutions of commonly used fertilizers which also contain dicyandiamide, in an amount to provide at least 10% by weight of dicyandiamide nitrogen which is an effective nitrification inhibitor.

While many of these techniques have a positive impact of maintaining the level of nitrogen in the soil, they also have significant problems. For example, problems that have adversely affected the agricultural industry include costs of improvement, loss of viability upon storage, and the inability to deliver consistent levels of fertilizer due to poor coating of the inhibitors or clumping of granules. Some innovations utilize aqueous delivery systems to granular fertilizer, However, aqueous delivery systems not only cause fertilizer to clump, but if this fertilizer has also been coated with an alkyl thiophosphoric triamide such as nBTP, the presence of the moisture will cause degradation of the alkyl thiophosphoric triamide. Other innovations utilize solvent systems to deliver alkyl thiophosphoric triamide to granular fertilizer, but these suffer from safety, environmental and/or impact to human health, are based on protic solvents which can degrade alkyl thiophosphoric triamide or coat with the nitrification inhibitor, DCD, from an aqueous solvent which will degrade alkyl thiophosphoric triamide.

Thus, there is a need for a composition, which addresses many of the shortcomings discussed above.

BRIEF SUMMARY OF THE INVENTION

Urea is a desirable starting material for fertilizers and fertilizer additives, which can provide high nitrogen content and can be used in fertilizer products that provide phosphorus or potassium as primary nutrients, and calcium, magnesium, or sulfur as secondary nutrients or micronutrients such as boron, copper, iron, manganese, molybdenum and zinc. These fertilizer products can deliver the nutrients to the soil and through numerous biological processes be converted to forms that are capable of being absorbed by plants. The use of urease inhibitors such as phosphoramides, typically, N-alkyl thiophosphoric triamide and/or nitrification inhibitor such as cyanoamides, typically, dicyanoamide applied to the fertilizer inhibits the enzymatic action of urease and/or biological oxidations by soil microbes, such as Nitrosomonas bacteria, from ammoniacal nitrogen to nitrate nitrogen.

Improved delivery formulations have been developed that deliver expected and effective levels of urease inhibitors and nitrification inhibitors that increase the nitrogen longevity in the soil. It has been found that the delivery formulations of the present invention provide a liquid vehicle to deliver an even, non-clumping application of the desired inhibitors to the fertilizer granule. It has also been discovered that formulations based on aprotic solvating systems and alkyl thiophosphoric triamides improve the storage life of these important urease inhibitors. Alkyl thiophosphoric triamides have been shown to be extremely effective urease inhibitors but suffer from degradation upon storage if exposed to moisture or protic based solvating systems. This degradation in protic based chemicals is increased as storage temperatures approach 50° C. resulting in sub-standard performance due to lower levels of the inhibitor.

To deliver a cost effective level of urease inhibitor to the surface of fertilizer, one should insure the stability of these sensitive thiophosphoric triamides. To improve the longevity of nitrogen in the soil, it has been found that one should incorporate both a urease inhibitor and also a nitrification inhibitor to the fertilizer. The improved delivery systems of the present invention incorporate phosphoric triamides in the fertilizer utilizing aprotic solvating systems. An additional surprising benefit to this delivery system was that they could be utilized as a vehicle to impart nitrification inhibitors such as, but not limited to 2-chloro-6-trichloromethyl)pyridine, 4-Amino-1,2,4-6-triazole-HCl, 2,4-Diamino-6-trichloromethyltriazine CL-1580, Dicyandiamide (DCD), thiourea, 1-Mercapto-1,2,4-triazole, and 2-Amino-4-chloro-6-methylpyrimidine. The combined impact of using a nitrification inhibitor together with a urease inhibitor in solution in the improved delivery system with enhanced storage stability lowers the cost of fertilizer by utilizing a one-step application to granules and delivering optimized levels of both inhibitors improving the longevity of nitrogen in the soil.

Thus, in one embodiment, the present invention comprises an improved composition of aprotic ingredients in a solvating system that:
  Are environmentally safe
  Have flashpoints above 145° F.
  Inherently rated safe for contact with humans and animals
  Maintain the urease inhibitors and/or nitrification inhibitors at levels of 1-50% in solution to storage temperatures down to at least 10° C.
  Provides improved even application to fertilizer granules of urease and/or nitrification inhibitors while not causing clumping of the granules.
  Gives improved stability of urease inhibitors, primarily alkyl thiophosphoramides in which N-(n-butyl)thiophosphoric triamide (NBPT) is a particularly effective urease inhibitor, of at least 10% over standard protic solvents.
  Allows two very important enzymatic inhibitors to be incorporated to soil that limits nitrogen losses of the soil from two different microbial mechanisms in a cost effective, one-step application process.

It was also discovered that while various aprotic solvents could meet the above criteria, the aprotic delivery system could be optimized to provide a formulation with a high concentration of inhibitors while maintaining a low chill point by combining two or more aprotic solvents in a solvating system. The process for preparing the formulation is that the combined solvents could be heated to ~60° C. and the inhibitors could be charged in a combined level of 10-60% of the total formula and dissolved in the solvent mixture with moderate agitation.

An effective solvent combination comprises dimethyl sulfoxide (DMSO) which can be used in combination with another aprotic solvent that has a low chill point and good solvating properties. A further advantage of using DMSO is that the DMSO also contributes the important nutrient of sulfur.

DETAILED DESCRIPTION

Improved delivery formulations have been developed that deliver effective levels of urease inhibitors and nitrification inhibitors that increase the nitrogen longevity in the soil. These delivery formulations not only provide a liquid vehicle to deliver an even, non-clumping application of the desired inhibitors to the fertilizer granule, but it was found that formulations based on aprotic solvating systems improve the storage life of the important urease inhibitors based on alkyl thiophosphoric triamides. The alkyl thiophosphoric triamides as contained in the present formulations have been shown to be extremely effective urease inhibitors but suffer from degradation upon storage if exposed to moisture or protic based solvating systems. This degradation in protic based chemicals is increased as storage temperatures approach 50° C. resulting in sub-standard performance due to lower levels of the inhibitor.

The delivery system is based on aprotic solvent(s) and can contain one or more of the following
  Urease inhibitor(s)
  Nitrification inhibitor(s)
  Additives such as but not limited to surfactants, buffers, fragrance/odor masking agents, colorants, micro-nutrients, and/or flow modifiers such as silica
  Protic solvents in amounts less than 15%, especially those based around secondary hydroxyls which without being bound by theory may in many instances be too sterically hindered to attack thiophosphoric triamides Aprotic solvents or blends of aprotic solvents that are utilized meet the criteria of being:
  environmentally safe
  safe because they have flashpoints above 145° F.
  Inherently rated safe for contact with humans and animals
  Able to maintain the urease inhibitors and/or nitrification inhibitors at levels of 1-50% in solution to storage temperatures down to at least 10° C.
  Able to provide improved even application to fertilizer granules of urease and/or nitrification inhibitors while not causing clumping of the granules.
  Able to provide improved stability of urease inhibitors, primarily alkyl thiophosphoramides in which N-(n-butyl)thiophosphoric triamide (NBPT) is a particularly effective urease inhibitor, of at least 10% over standard protic solvents.
  Able to provide a formulation that delivers two very important enzymatic inhibitors to soil that limits the two different microbial mechanisms that result in losses of nitrogen in the soil in a cost effective, one-step application process In one embodiment, the solvating system of the present invention is an aprotic solvent or a blend of aprotic solvents, which may include but are not limited to one or more of the following:
Dimethyl sulfoxide, Dimethylacetamide, Dimethylformamide Hexamethylphosphoramide, propylene carbonate, ethylene carbonate, butylene carbonate, 1,2-dimethyloxethane, 2-methoxyethyl ether, cyclohexylpyrrolidone, ethyl lactate, and 1,3 dimethyl-2-imidazolidinone, limonene, acetate and/or fumerate capping of glycols which include but are not limited to the following glycols:
  ethylene glycol, propylene glycol, butylene glycol, trimethylol propane, pentaerythritol, glycerine, trimethylol ethane, polyethylene glycol, polypropylene glycol, polyethylene/polypropylene glycol co-polymer, Tripropylene glycol methyl ether, Tripropylene glycol butyl ether.

Additionally, the delivery formulation may contain the following:
  a food coloring or dye that may be used to improve the visual evidence of complete coverage and serve as a visual marker
  scents or masking agents to improve the odor of the formula
  Nonionic, anionic, cationic, zwitterionic, and/or amphoteric surfactants to improve formula application performance of fertilizer granules
  Buffering agents In an embodiment, the formulation may contain one or more urease inhibitors. Urease inhibitors can be but are not limited to phosphoric triamides. While phosphoric triamides are extremely effective, thiophosphoric triamides have longer term impact on soil nitrogen content and also contribute the primary nutrient of sulfur to the soil. The presence of an alkyl group on the thiophosphoric triamides, such as n-butyl thiophosphoric triamide, improves further the urease inhibitor's longevity in the soil. Effective levels of urease inhibitor levels in the delivery system are 5-50% or 10-50% or 20-40%. The low temperature of the dispersion procedure and the application to the surface of the pre-formed fertilizer granule prevent the degradative impact of heat on these phosphoric triamides.

In an embodiment, the formulation may contain one or more nitrification inhibitors. Nitrification inhibitors may be but are not limited to 2-chloro-6 trichloromethyl)pyridine, 4-Amino-1,2,4-6-triazole-HCl, 2,4-Diamino-6-trichloromethyltriazine CL-1580, Dicyandiamide (DCD), thiourea, 1-Mercapto-1,2,4-triazole and/or 2-Amino-4-chloro-6-methylpyrimidine. In one embodiment, the formulations of the present invention may use Dicyandiamide at levels from between about 5-50% in the delivery system due. This gives cost effective performance and provides the secondary benefit of being a slow release fertilizer because of its 65% nitrogen content. Others have utilized water as the delivery solvent, or cost prohibitive coating/adhesion technologies. In an embodiment of the present invention, the utilization of ambient temperature aprotic solvent systems allows for non-clumping granules as well as non-degradation of fertilizers containing the urease inhibitors based on phosphoric triamides. Accordingly, the present invention allows for the additional benefit that coating or adhesion to maintain the presence of a consistent level of nitrification inhibitor on the fertilizer is not needed.

In an embodiment, NBPT is added to an 80/20 to 20/80 mix of dimethyl sulfoxide (DMSO) and propylene carbonate with the NBPT being about 5-45% by weight. In an embodiment, NBPT is added, under agitation, to the combined aprotic solvents that have been heated in a mixing vessel at a desired temperature of about 0° C. to 60° C., or alternatively at a temperature of about 10° C. to 50° C. or alternatively, at a temperature of about 20° C. to 40° C. and mixed until the NBPT is completely dissolved. The heated mix vessel in one embodiment, may be jacketed and the temperature carefully controlled. In one embodiment, the mixing action should allow complete mixing without too much aeration. In a variation, the heating may be accomplished using hot water or low pressure steam to control any hot spots on walls of the vessel to prevent heat degradation to the NBPT. At this stage, the mixture can be cooled to about 25° C. or below and one or more of the following may be added, if desired:
  a food coloring or dye that improves the visual evidence of complete coverage and serves as a visual marker
  scents or masking agents that improve the odor of the formula
  Nonionic, anionic, cationic, zwitterionic, and/or amphoteric surfactants to improve formula application performance on insuring even distribution and of fertilizer granules in the soil; and/or
  Buffering agents In another embodiment, NBPT may be present at a 10-30% level and Dicyandiamide (DCD) at a 10-30% level may be added to DMSO and an acetate capped tripropylene glycol methyl ether at a ratio of 80/20 to 20/80. In an embodiment, NBPT may be added, under agitation, to the combined aprotic solvents that have been heated in a mixing vessel at a desired temperature of about 0° C. to 60° C., or alternatively, at a temperature of about 10° C. to 50° C. and, alternatively, to a temperature of about 20° C. to 40° C. and mixed until the NBPT and DCD are completely dissolved. In an embodiment, the heated mix vessel may be jacketed and temperature controlled. In an embodiment, the mixing action may allow complete mixing without too much aeration. In an embodiment, the heating may be accomplished using hot water or low pressure steam to control any hot spots on walls of the vessel, which can prevent heat degradation to the NBPT. At this stage, the mixture can be cooled to about 25° C. or below and the following one or more additives may be added, if desired:
  a food coloring or dye may be used to improve the visual evidence of complete coverage and serve as a visual marker;
  scents or masking agents to improve the odor of the formula;
  Nonionic, anionic, cationic, zwitterionic, and/or amphoteric surfactants to improve formula application performance of fertilizer granules; and/or
  Buffering agents In an embodiment, Dicyandiamide (DCD) may be incorporated at a 10-45% level to a mixture of DMSO and propylene carbonate at a ratio of about 80/20 to 20/80. In an embodiment, DCD may be added, under agitation, to the combined aprotic solvents that have been heated in a mixing vessel at a temperature of about 0° C. to 60° C. and mixed until the DCD is completely dissolved. In an embodiment, the heated mix vessel may be jacketed and the temperature controlled. In a variation, the mixing action allows complete mixing without too much aeration. The heating can be accomplished using hot water or low pressure steam to control any hot spots on walls of the vessel to prevent heat degradation to the DCD. At this stage, the mixture may be cooled to 25° C. or below and one or more of the following may be added, if desired:
  a food coloring or dye may be used to improve the visual evidence of complete coverage and serve as a visual marker;
  scents or masking agents to improve the odor of the formula;
  Nonionic, anionic, cationic, zwitterionic, and/or amphoteric surfactants to improve formula application performance of fertilizer granules; and/or
  Buffering agents In an embodiment, urease inhibitor and/or nitrification inhibitor may be added. In an embodiment, the urease inhibitor and/or nitrification inhibitor may be dissolved in the mixture. In an embodiment, useful mixtures may be prepared either by dilution or mixture with liquid fertilizers. Examples of the present formulation include liquid mixtures of urea or solid mixtures that may be made by contacting the mixture with solid fertilizers such as granular urea. In an embodiment, coating with granular urea can be prepared by using any commercially available equipment in which granular product can be mixed or sprayed with a liquid. A flow aid, silicas or surfactants such as soap or nonionic surfactants may be added prior to addition of the liquid for improved dispersability.

The resulting product(s) can be applied to soil in either a liquid or granular form to provide improved nitrogen retention in the soil for uptake for plant life.

The following Examples are presented to illustrate certain embodiments of the present invention.

EXAMPLE 1

50 grams of dimethyl sulfoxide was charged to a vessel and then placed under strong agitation and then heated to 80° C. 20 grams of dicyandiamide was then charged to the vessel and mixed until completely dissolved. Once dissolved, the mixture was cooled to 38° C. and then 5 grams of n-butyl thiophosphoric triamide was charged to the vessel and mixed until completely dissolved. 15 grams of propylene carbonate and 10 grams of propylene glycol were charged to the vessel and the mixture was agitated for 30 minutes. The mixture was then cooled to <30° C. and then packaged off in an appropriate container for evaluation.

EXAMPLE 2

50 grams of dimethyl sulfoxide was charged to a vessel and then placed under strong agitation and then heated to 50° C. 10 grams of dicyandiamide was then charged to the vessel and mixed until completely dissolved. Once dissolved, the mixture was cooled to 50° C. and then 10 grams of 2-chloro-6-trichloromethylpyridine was added and mixed until dissolved. The mixture was then cooled to 38° C. and then 5 grams of n-butyl thiophosphoric triamide was charged to the vessel and mixed until completely dissolved. 15 grams of propylene carbonate and 10 grams of ethylene glycol were charged to the vessel and the mixture is agitated for 30 minutes. The mixture is then cooled to <30° C. and then packaged off in an appropriate container for evaluation.

EXAMPLE 3

45 grams of dimethyl sulfoxide was charged to a vessel and then placed under strong agitation and then heated to 80° C. 15 grams of dicyandiamide and 10 grams of thiourea were then charged to the vessel and mixed until completely dissolved. Once dissolved, the mixture is cooled to 38° C. and then 5 grams of n-butyl thiophosphoric triamide was charged to the vessel and mixed until completely dissolved. 15 grams of dipropylene glycol methyl ether acetate and 10 grams of propylene glycol were charged to the vessel and the mixture is agitated for 30 minutes. The mixture was then cooled to <30° C. and then packaged off in an appropriate container for evaluation.

EXAMPLE 4

75 grams of dimethyl sulfoxide was charged to a vessel and then placed under strong agitation and then heated to 60° C. 25 grams of 2-chloro-6-trichloromethylpyridine was then charged to the vessel and mixed until completely dissolved. Once dissolved, the mixture was cooled to <30° C. and then packaged off in an appropriate container for evaluation.

EXAMPLE 5

58.3 grams of dimethyl sulfoxide was charged to a vessel and then placed under strong agitation and then heated to 60° C. 25 grams of 3,4 dimethylpyrazole phosphate was then charged to the vessel and mixed until completely dissolved. Once dissolved, the mixture was cooled to 38° C. and then 4.3 grams of dipropylene glycol methyl ether acetate and 12.5 grams of propylene carbonate were charged to the vessel and the mixture was agitated for 30 minutes. The mixture was then cooled to <30° C. and then packaged off in an appropriate container for evaluation.

EXAMPLE 6

36.4 grams of dimethyl sulfoxide was charged to a vessel and then placed under strong agitation and then heated to 60° C. 25 grams of 2-chloro-6-trichloromethylpyridine was then charged to the vessel and mixed until completely dissolved. Once dissolved, the mixture was cooled to 38° C. and then 43.66 grams of dipropylene glycol methyl ether acetate was charged to the vessel and the mixture was agitated for 30 minutes. The mixture is then cooled to <30° C. and then packaged off in an appropriate container for evaluation.

EXAMPLE 7

45 grams of dimethyl sulfoxide was charged to a vessel and then placed under strong agitation and then heated to 60° C. 25 grams of 2-chloro-6-trichloromethylpyridine was then charged to the vessel and mixed until completely dissolved. Once dissolved, the mixture was cooled to 380° C. and then 30 grams of N,N-dimethyl 9-decenamide was added to the vessel and the mixture was agitated for 30 minutes. The mixture was then cooled to <30° C. and then packaged off in an appropriate container for evaluation.

EXAMPLE 8

45 grams of dimethyl sulfoxide was charged to a vessel and then placed under strong agitation and then heated to 60° C. 15 grams of 2-chloro-6-trichloromethylpyridine was then charged to the vessel and mixed until completely dissolved. Once dissolved, the mixture was cooled to 38° C. and then 10 grams of n-butylthiophosphoric triamide was and the resulting product was mixed until dissolved. 30 grams of dipropylene glycol methyl ether acetate was charged to the vessel and the mixture was agitated for 30 minutes. The mixture was then cooled to <30° C. and then packaged off in an appropriate container for evaluation.

EXAMPLE 9

80 grams of dimethyl sulfoxide was charged to a vessel and then placed under strong agitation and then heated to 80° C. 20 grams of dicyandiamide was then charged to the vessel and mixed until completely dissolved. Once dissolved, the mixture was cooled to 30° C. and packaged off in an appropriate container for evaluation.

EXAMPLE 10

80 grams of dimethyl sulfoxide was charged to a vessel and then placed under strong agitation and then heated to 38° C. 20 grams of n-butylthiophosphoric triamide was then charged to the vessel and mixed until completely dissolved. Once dissolved, the mixture was cooled to 30° C. and packaged off in an appropriate container for evaluation.

EXAMPLE 11

80 grams of propylene carbonate was charged to a vessel and then placed under strong agitation and then heated to 38° C. 20 grams of n-butylthiophosphoric triamide was then charged to the vessel and mixed until completely dissolved. Once dissolved, the mixture was cooled to 30° C. and packaged off in an appropriate container for evaluation.

EXAMPLE 12

80 grams of propylene carbonate was charged to a vessel and then placed under strong agitation and then heated to 38° C. 20 grams of dicyandiamide was then charged to the vessel and mixed until completely dissolved. Once dissolved, the mixture was cooled to 30° C. and packaged off in an appropriate container for evaluation.

EXAMPLE 13

80 grams of dipropylene glycol methyl ether acetate was charged to a vessel and then placed under strong agitation and then heated to 80° C. 20 grams of dicyandiamide was then charged to the vessel and mixed until completely dissolved. Once dissolved, the mixture was cooled to 30° C. and packaged off in an appropriate container for evaluation.

EXAMPLE 14

50 grams of Example 10 and 50 grams of Example 11 were mixed together for 30 minutes and then packaged off in an appropriate container for evaluation.

EXAMPLE 15

50 grams of dimethyl sulfoxide was charged to a vessel and then placed under strong agitation and heated to 380° C. 20 grams of n-butylphosphoric triamide was then charged to the vessel and mixed until completely dissolved. 20 grams of propylene carbonate was then charged and mixed for 30 minutes. The mixture was then cooled to 30° C. and packaged off in an appropriate container for evaluation.

EXAMPLE 16

80 grams of dimethyl sulfoxide was charged to a vessel and then placed under strong agitation and heated to 38° C. 20 grams of n-butylthiophosphate triamide was then charged to the vessel and mixed until completely dissolved. The mixture was cooled to 30° C. and packaged off in an appropriate container for evaluation.

EXAMPLE 17

50 grams of dimethyl sulfoxide was charged to a vessel and then placed under strong agitation and then heated to 80° C. 20 grams of dicyandiamide was then charged to the vessel and mixed until completely dissolved. Once dissolved, the mixture was cooled to 30° C. and 16 grams of propylene carbonate, and 14 grams of propylene glycol were charged to the vessel and then mixed for 15 minutes and packaged off in an appropriate container for evaluation.

EXAMPLE 18

80 grams of propylene glycol was charged to a vessel and then placed under strong agitation and then heated to 38° C. 20 grams of n-butylthiophosphate triamide was then charged to the vessel and mixed until completely dissolved. The mixture was cooled to 30° C. and packaged off in an appropriate container for evaluation.

EXAMPLE 19

50 grams of dimethyl acetamide was charged to a vessel and then placed under strong agitation and then heated to 38° C. 20 grams of n-butylthiophosphate triamide was then charged to the vessel and mixed until completely dissolved. Once dissolved, the mixture was cooled to 30° C. and 20 grams of propylene carbonate and 10 grams of propylene glycol were charged to the vessel and mixed for 15 minutes and then packaged off in an appropriate container for evaluation.

EXAMPLE 20

75 grams of dimethyl sulfoxide was charged to a vessel and then placed under strong agitation and then heated to 60° C. 25 grams of 3,4 dimethylpyrazole phosphate was then charged to the vessel and mixed until completely dissolved. Once dissolved, the mixture was cooled <30° C. and then packaged off in an appropriate container for evaluation.

Samples from Examples 1-20 were evaluated for physical properties and the results are shown in the below Table 1:

TABLE 1

| Sample # | Stability 24 hrs @ 20° C. | Chill Point ° F. | Human Health Rating | Flash Point ° F. | Aquatic Toxicity Rating |
|---|---|---|---|---|---|
| Ex 1  | Stable      | <−5° | 2.0 | >145° | Low    |
| Ex 2  | Stable      | <−5° | 1.0 | >145° | Low    |
| Ex 3  | Stable      | <−5° | 1.0 | >145° | Low    |
| Ex 4  | Stable      | 140° | 1.0 | >145° | Low    |
| Ex 5  | Stable      | <−5° | 1.0 | >145° | Low    |
| Ex 6  | Stable      | <−5° | 1.0 | >145° | Low    |
| Ex 7  | Stable      | 10°  | 2   | >145° | Medium |
| Ex 8  | Stable      | <−5° | 1   | >145° | Low    |
| Ex 9  | Stable      | 25°  | 1   | >145° | Low    |
| Ex 10 | Stable      | 32°  | 1   | >145° | Low    |
| Ex 11 | cloudy      | 72°  | 1   | >145° | Low    |
| Ex 12 | Not soluble | N/A  | 1   | >145° | Low    |
| Ex 13 | Not soluble | N/A  | 1   | >145° | Low    |
| Ex 14 | Stable      | <−5° | 1   | >145° | Low    |
| Ex 15 | Stable      | <−5° | 1   | >145° | Low    |
| Ex 16 | Stable      | 20°  | 1   | >145° | Low    |
| Ex 17 | Stable      | <−5° | 1   | >145° | Low    |
| Ex 18 | Stable      | 46°  | 1   | >145° | Low    |
| Ex 19 | Stable      | <−5° | 3   | >145° | Medium |
| Ex 20 | Stable      | 55°  | 1   | >145° | Low    |

The Human Health rating is based on HMIS (Hazardous Materials Information System) rating on Health of any organo solvent component >2%
The Flash Point is based on flash point of any organo solvent component >5%
The Aquatic Toxicity Rating is based on any organo solvent component at any level It should be apparent from the above table that a combination of factors will produce a solvent system that is
 a. environmentally safe
 b. has a flashpoint above 145° F.
 c. inherently rated safe for contact with humans and animals
 d. results in a composition comprising at least one of nitrification and urease inhibitors with a chill point <40° F.

The results as shown in the above table demonstrate that the usage of a single aprotic solvent may in some instances show a much higher chill point product versus blends of aprotic solvents. For example, comparing examples 4 and 6 show that the incorporation of extra solvents has a beneficial effect as it relates to the lower chill point. Other trends can be observed by comparing a) examples 9, and examples 13-17, b) example 10 to examples 11-14 and c) example 5 to example 20.

EXAMPLE 21

To better visualize coating and penetration on the urea prills, Example 17 was dyed with powdered 'Rhodamine 6G' dye (Sigma-Aldrich). The powdered dye (20 mg) was added to 10 mL of Example 17 and mixed thoroughly. The resulting product was reddish-purple in color. It was then topically applied to granulated urea at an application rate equivalent to 3 qt/ton. The resulting product was thoroughly mixed for three minutes, providing uniform coverage to the prills. The product was then allowed to sit for 3 hours.

Eight spherical prills of relatively uniform size were selected at random from the red-dyed covered urea. The prills were split in half with a razor blade. One half of each prill was glued to a piece of paper with the split face (middle) facing up, and the prills were photographed.

Figure 1:
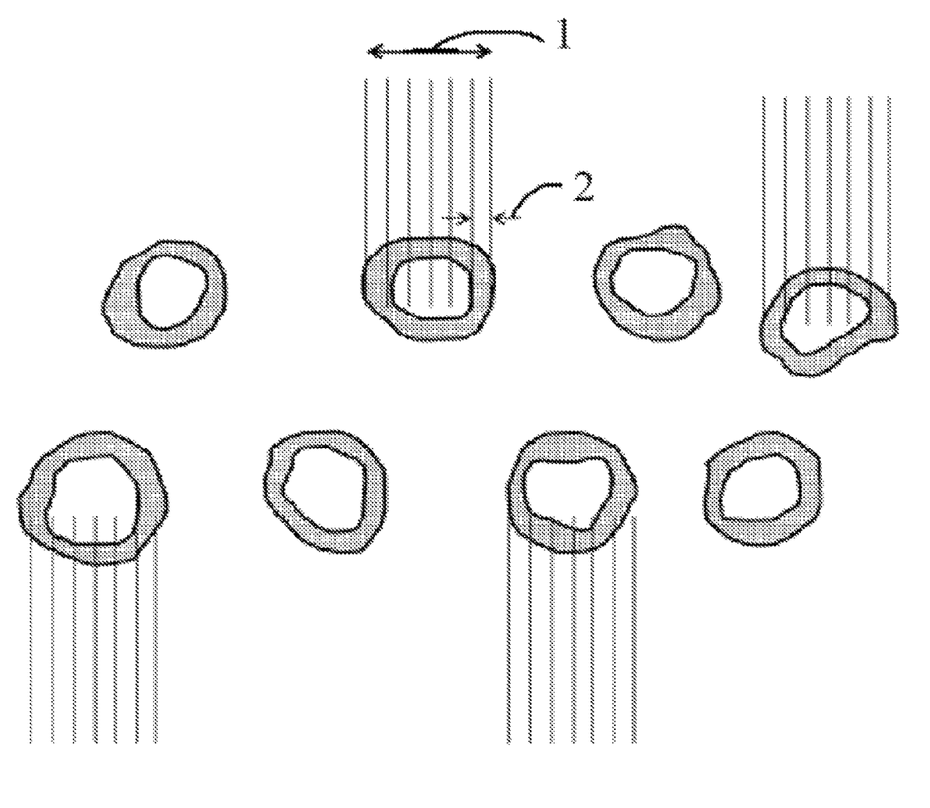
The FIGURE shows prills of urea that have been covered with the composition that is Example 17 discussed infra.

The coverage on the urea prills was equally uniform as was the penetration of the prills. The average prill diameter was 3.2 mm (⅛ inch). Example 17 penetrated the prills approximately one-sixth of the diameter, or to a depth of 0.5 mm (1148 inch). The penetration depth of 0.5 mm is visually demonstrated in FIG. 1. The average diameter 1 of each urea covered prill is shown in FIG. 1 as well as well as the average penetration depth 2.

EXAMPLE 22

An inhibition study was conducted as described below.
Experimental Outline:

A 12 week laboratory experiment was conducted in an incubation chamber set to a constant air temperature of 85° F. The experiment consisted of 4 replicate 1 quart disposal plastic tubs, each filled with 250 grams of wetted soil (a Marvyn loamy sand, which is approximately 80% sand), each of which was submitted to the appropriate treatments. Prior to placing the soil in the jar the sample was sieved through a 2 mm screen and wetted to an uniform water content (~70% of field capacity). The background soil sample indicated the following parameters: soil pH: 5.6, phosphorus: 15 lb/A, potassium: 32 lb/A, magnesium: 20 lb/A and calcium: 139 lb/A. No lime or additional fertilizers were added to this soil.

The following 5 treatments were evaluated, and there were four replications of each treatment.

| Sample | Treatment |
|---|---|
| 1 | 4 quarts of Example 17 per ton of urea |
| 2 | 6 quarts of Example 17 per ton of urea |
| 3 | 8 quarts of Example 17 per ton of urea |
| 4 | Urea only control |
| 5 | No fertilizer control |

The correct amount of Example 17 to treat one pound of urea was calculated, and that amount was sprayed on to the urea using an air brush sprayer. Example 17 was not diluted, and a uniform coating was achieved. The treated (and untreated) ureas were then mixed at an N ratio of 120 pounds N/acre. The corresponding N ratio was calculated using the area of the plastic tub.

The soil-fertilizer mix was placed into the incubator. Each week thereafter (for 12 weeks) the following occurred: 1) each bin was removed from the incubator, opened and lightly mixed before sampling, 2) a 2 g subsample of soil was removed for soil-water content determination, and, 3) a 2 g subsample of soil was removed for soil nitrate and ammonium concentration (via 2M KCl extraction). The bins were resealed and returned to the incubator until the next sampling date.

Conclusions:

Application of Example 17 at 4 qt/T significantly increased soil ammonium-N at weeks 4, 5 and 6. When Example 17 was applied at 6 qt/T there was more soil ammonium-N (as compared to the urea only treatment) at weeks 3 and 6. The best inhibition of nitrification was observed when the Example 17 was applied at 8 qt/T, as soil ammonium in that treatment was greater than measured in the urea only treatment at weeks 2, 3, 4, 5, 6 and 7. This ratio gives the best inhibition of nitrification.

If nitrification is inhibited, the nitrogen content resulting from ammonium will accumulate, as the ammonium to nitrate conversion is slowed. Since nitrate-N production is slowed, the treatments to which an inhibitor should have reduced nitrate-N. This was observed when the highest rate of Example 17 was applied (8 qt/T) and the effect was significant (as compared to the urea only treatments) in weeks 4, 5, 6 and 7. When lower rates of Example 17 were applied, the effect was only significant at weeks 5 and 7.

In this one time, 8 week incubation study when Example 17 was applied to urea at 8 qt/Ton it exhibited significant nitrification inhibitory properties.

EXAMPLE 23

A degradation study was performed using 2-chloro-6-trichloromethylpyridine/nBPT in DMSO 2-chloro-6-trichloromethylpyridine/NBPT=1/1 (w/w) mixture was dissolved in DMSO. LC's were done to analyze the content decrease along with time. All samples were sealed and protected under $N_2$. All sample were stored 50° C.

Analysis Condition:

C18 column, 255 nm. Retention time: 40 min. temperature: 30° C. 15 μL injection. Peak area percentage were calculated to analyze the concentration.

The results of the degradation study are shown in table 2.

TABLE 2

| | DMSO | |
|---|---|---|
| Solvent solute Week # | 2-chloro-6-trichloromethyl-pyridine | n-butylthio-phosphoric triamide |
| 1 | 100 | 100 |
| 2 | 99 | 99.6 |
| 3 | 99.4 | 98 |
| 4 | 98.3 | 97.6 |
| 6 | 95.3 | 96.5 |
| 7 | 93.2 | 95.3 |
| 8 | 92.3 | 94.7 |
| 9 | 90.8 | 93 |
| 10 | 88 | 92.2 |
| 11 | 86.7 | 92.1 |
| 12 | 86.4 | 91.7 |
| 13 | 85 | 91 |
| 14 | 84.33 | 90.88 |
| 15 | 83.56 | 90.01 |
| 16 | 81.45 | 99.55 |
| 17 | 81 | 89.06 |
| 18 | 80.09 | 88.6 |

Both actives show good stability in DMSO at 50° C. for 18 weeks.

In an embodiment, the present invention relates to a composition comprising one or more nitrification inhibitors and/or urease inhibitors in an organic liquid solvating system comprising a mixture of aprotic solvents wherein a first aprotic solvent is dimethyl sulfoxide, dialkyl sulfoxide, diaryl sulfoxide, or an alkylaryl sulfoxide having the formula $R_1$—S(O)—$R_2$, wherein $R_1$ is methyl, ethyl, n-propyl, phenyl or benzyl and $R_2$ is ethyl, n-propyl, phenyl or benzyl,
and a second aprotic solvent is one or more of
1) a $C_1$-$C_{12}$ ester of
   a) an alcohol or polyol from the family of $C_{1-10}$ alkynols and poly($C_{1-10}$ alkylene) glycols,
   b) an alkylene glycol selected from the group consisting of ethylene, propylene, and butylene glycol,
   c) glycerin,
   d) an alkylene glycol alkyl ether selected from the group consisting of dipropylene glycol methyl ether tripropylene glycol methyl ether, and tripropylene glycol butyl ether
2) an alkanolamine selected from the group consisting of ethanolamine, diethanolamine, dipropanolamine, methyl diethanolamine, monoisopropanolamine and triethanolamine, and/or
3) ethyl, propyl, or butyl lactate
wherein the organic liquid solvating system meets the following criteria:
   e. environmentally safe
   f. has a flashpoint above 145° F.
   g. inherently rated safe for contact with humans and animals
   h. results in a composition comprising at least one of nitrification and urease inhibitors with a Chill Point <40° F.

In an embodiment the composition comprises a nitrification inhibitor that is one or more of the following 1) dicyandiamide, 2) 2-chloro-6 trichloromethyl)pyridine, 3) 4-amino-1,2,4-6-triazole-HCl, 4) 2,4-diamino-6-trichloromethyltriazine, 5) thiourea, 6) 1-mercapto-1,2,4-triazole and 2-amino-4-chloro-6-methylpyrimidine, or 7) 3,4-dimethylpyrazole phosphate.

In one variation, the composition comprises an aprotic solvents in the mixture that is dimethyl sulfoxide. In a variation, dimethyl sulfoxide comprises between about 10 and 90% of the total composition.

In one embodiment, the nitrification inhibitor(s) is/are present in an amount that is between about 5-45% of a total formulation amount and the composition also contains a mixture of DMSO and one or more aprotic solvents in ratios that are between about 20/80 to 80/20.

In an embodiment, the composition further comprises: one or more of protic solvents present in the amount of 0.5-15%, surfactants, buffers, fragrance/odor masking agents, colorants, micro-nutrients, dispersed nitrification inhibitors, dispersed urease inhibitor(s), crystallization inhibitors and/or flow modifiers.

In an embodiment, the nitrification inhibitor(s) is/are present in an amount that is between about 5-45% of a total formulation amount and the formulation also comprises N-(n-butyl)thiophosphoric triamide in an amount that is between about 5-45% of the total formulation amount.

In one embodiment, the composition is substantially free of water.

In an embodiment, the present invention relates to a fertilizer granule or liquid additive, which comprises one or more nitrification inhibitors and/or urease inhibitors in an organic liquid solvating system comprising a mixture of aprotic solvents:

wherein a first aprotic solvent is dimethyl sulfoxide, dialkyl sulfoxide, diaryl sulfoxide, or an alkylaryl sulfoxide having the formula $R_1$—S(O)—$R_2$, wherein $R_1$ is methyl, ethyl, n-propyl, phenyl or benzyl and $R_2$ is ethyl, n-propyl, phenyl or benzyl,
and a second aprotic solvent is one or more of
1) a $C_1$-$C_{12}$ ester of
   a) an alcohol or polyol from the family of $C_{1-10}$ alkynols and poly($C_{1-10}$ alkylene) glycols,
   b) an alkylene glycol selected from the group consisting of ethylene, propylene, and butylene glycol,
   c) glycerin,
   d) an alkylene glycol alkyl ether selected from the group consisting of dipropylene glycol methyl ether, tripropylene glycol methyl ether, and tripropylene glycol butyl ether:
2) an alkanolamine selected from the group consisting of ethanolamine, diethanolamine, dipropanolamine, methyl diethanolamine, monoisopropanolamine, and triethanolamine, and/or
3) ethyl, propyl, or butyl lactate
wherein the organo liquid solvating system meets the following criteria:
   a. Environmentally safe
   b. Have flashpoint above 145 F
   c. Inherently rated safe for contact with humans and animals
   d. That result in a composition comprising of nitrification and/or urease inhibitor with a Chill Point <40 F.

In an embodiment, the fertilizer granule or liquid additive comprises one or more nitrification inhibitors such as 1) dicyandiamide, 2) 2-chloro-6 trichloromethyl)pyridine, 3) 4-amino-1,2,4-6-triazole-HCl, 4) 2,4-diamino-6-trichloromethyltriazine, 5) thiourea, 6) 1-mercapto-1,2,4-triazole and 2-amino-4-chloro-6-methylpyrimidine, or 7) 3,4 dimethylpyrazole phosphate.

In a variation, the fertilizer granule or liquid additive may further comprise one or more urease inhibitors such as phosphoric triamides, thiophosphoric triamides or alkylated thiophosphoric triamides, wherein the alkylated thiophosphoric triamides have one or more alkyl groups that independently contain between 1 and 6 carbon atoms.

In an embodiment, the fertilizer granule or liquid additive may contain one or more nitrification inhibitors such as 1) dicyandiamide, 2) 2-chloro-6 trichloromethyl)pyridine, 3) 4-amino-1,2,4-6-triazole-HCl, 4) 2,4-diamino-6-trichloromethyltriazine, 5) thiourea, 6) 1-mercapto-1,2,4-triazole and 2-Amino-4-chloro-6-methylpyrimidine, or 7) 3,4 dimethylpyrazole phosphate; wherein the one or more urease inhibitors comprises phosphoramides.

In an embodiment, the present invention relates to making the compositions and fertilizer granules and liquid additives of the present invention. In one variation, the method relates to making a composition to be added to a fertilizer comprising:

heating a mixture comprising one or more nitrification inhibitors in an organic liquid solvating system comprising a mixture of aprotic solvents wherein a first aprotic solvent is dimethyl sulfoxide, dialkyl sulfoxide, diaryl sulfoxide, or an alkylaryl sulfoxide having the formula $R_1$—S(O)—$R_2$, wherein $R_1$ is methyl, ethyl, n-propyl, phenyl or benzyl and $R_2$ is ethyl, n-propyl, phenyl or benzyl, and a second aprotic solvent is one or more of
1) a $C_1$-$C_{12}$ ester of
   a) an alcohol or polyol from the family of $C_{1-10}$ alkynols and poly($C_{1-10}$ alkylene) glycols,
   b) an alkylene glycol selected from the group consisting of ethylene, propylene, and butylene glycol,
   c) glycerin,
   d) an alkylene glycol alkyl ethers selected from the group consisting of Dipropylene glycol methyl ether Tripropylene glycol methyl ether, and Tripropylene glycol butyl ether
2) an alkanolamine selected from the group consisting of ethanolamine, diethanolamine, dipropanolamine, methyl diethanolamine, monoisopropanolamine and triethanolamine, and/or
3) ethyl, propyl, or butyl lactate.
   wherein the organo liquid solvating system meets the following criteria:
   a. Environmentally safe
   b. Have flashpoints above 145 F
   c. Inherently rated safe for contact with humans and animals
      i. That result in a composition comprising of nitrification and urease inhibitor with a chill point <40 F
and cooling the mixture to a temperature that optionally allows an addition of one or more of
protic solvents present in the amount of 0.5-15%, surfactants, buffers, fragrance/odor masking agents, colorants, micro-nutrients, dispersed nitrification inhibitors, dispersed urease inhibitor(s), crystallization inhibitors and/or flow modifiers.

In a variation, the method further comprises adding the composition to a fertilizer granule or liquid as an additive.

In one variation, the method makes a composition wherein the one or more nitrification inhibitors is selected from the group consisting of 1) dicyandiamide, 2) 2-chloro-6 trichloromethyl)pyridine, 3) 4-amino-1,2,4-6-triazole-HCl, 4) 2,4-diamino-6-trichloromethyltriazine, 5) thiourea, 6) 1-mercapto-1,2,4-triazole and 2-amino-4-chloro-6-methylpyrimidine, and 7) 3,4 dimethylpyrazole phosphate.

In one variation, the method uses one or more urease inhibitors selected from the group consisting of phosphoric triamides, thiophosphoric triamides and alkylated thiophosphoric triamides, wherein the alkylated thiophosphoric triamides have one or more alkyl groups that independently contain between 1 and 6 carbon atoms.

In one variation, the method uses one or more nitrification inhibitors such as 1) dicyandiamide, 2) 2-chloro-6 trichloromethyl)pyridine, 3) 4-amino-1,2,4-6-triazole-HCl, 4) 2,4-diamino-6-trichloromethyltriazine, 5) thiourea, 6) 1-mercapto-1,2,4-triazole and 2-amino-4-chloro-6-methylpyrimidine, 7) 3,4 dimethylpyrazole phosphate; and the one or more urease inhibitors comprises phosphoramides.

In one variation of the method, the method employs steps so as to make sure that the composition is substantially free of water.

The following references are incorporated by reference in their entireties.

| | | | |
|---|---|---|---|
| 4,234,332 | | | Michaud |
| 4,294,604 | | | Evrard |
| 4,530,714 | A | July 1985 | Kolc et at |
| 5,024,689 | A | June 1991 | Sutton et al. |
| 5,106,984 | | | Halpen |

-continued

| | | | |
|---|---|---|---|
| 5,352,265 | A | October 1994 | Weston et al. |
| 5,364,438 | A | November 1994 | Weston et al. |
| 5,698,003 | A | December 1997 | Omilinsky et al |
| 6,488,734 | | | Barth |
| 6,830,603 | B2 | December 2004 | Whitehurst et al. |
| 2004/0163434 | A1 | August 2004 | Quin |
| 2006/0185411 | A1 | August 2006 | Hojjatie et al. |
| 2007/0157689 | A1 | July 2007 | Sutton et al. |
| 2007/0295047 | A1 | December 2007 | Sutton |
| 8,133,294 | B2 | April 2012 | Whitehurst et al. |
| 8,562,711 | | | Sutton |

FOREIGN PATENT DOCUMENTS

| | | |
|---|---|---|
| WO | WO 2008/000196 | 12008 |

We claim:

1. A composition comprising one or more nitrification inhibitors and one or more urease inhibitors in an organic liquid solvating system comprising a mixture of aprotic solvents
wherein a first aprotic solvent is dimethyl sulfoxide, dialkyl sulfoxide, diaryl sulfoxide, or an alkylaryl sulfoxide having the formula wherein $R_1$ is methyl, ethyl, n-propyl, phenyl or benzyl and $R_2$ is ethyl, n-propyl, phenyl or benzyl,
and a second aprotic solvent is one or more members selected from the group consisting of:
1) a $C_1$-$C_{12}$ ester of
   a) an alcohol or polyol from the family of $C_{1-10}$ alkynols and poly($C_{1-10}$ alkylene) glycols,
   b) an alkylene glycol selected from the group consisting of ethylene, propylene, and butylene glycol,
   c) glycerin,
   d) an alkylene glycol alkyl ether selected from the group consisting of dipropylene glycol methyl ether, tripropylene glycol methyl ether, and tripropylene glycol butyl ether
wherein the organic liquid solvating system meets the following criteria:
   a. environmentally safe
   b. has a flashpoint above 145° F.
   c. inherently rated safe for contact with humans and animals
   d. results in a composition comprising at least one of nitrification and urease inhibitors with a Chill Point <40° F.

2. The composition of claim 1, wherein the nitrification inhibitor is one or more members selected from the group consisting of 1) dicyandiamide, 2) 2-chloro-6 trichloromethyl)pyridine, 3) 4-amino-1,2,4-6-triazole-HCl, 4) 2,4-diamino-6-trichloromethyltriazine, 5) thiourea, 6) 1-mercapto-1,2,4-triazole and 2-amino-4-chloro-6-methylpyrimidine, and 7) 3,4-dimethylpyrazole phosphate.

3. The composition of claim 1, wherein one of the aprotic solvents in the mixture is dimethyl sulfoxide.

4. The composition of claim 3, wherein dimethyl sulfoxide comprises between about 10 and 90% of the composition.

5. The composition of claim 1 wherein the one or more nitrification inhibitors comprises one or more members selected from the group consisting of 1) dicyandiamide, 2) 2-chloro-6 trichloromethyl)pyridine, 3) 4-amino-1,2,4-6-tri- azole-HCl, 4) 2,4-diamino-6-trichloromethyltriazine, 5) thiourea, 6) 1-mercapto-1,2,4-triazole and 2-amino-4-chloro-6-methylpyrimidine, and 7) 3,4 dimethylpyrazole phosphate;
  in a formulation wherein nitrification inhibitor(s) is/are present in an amount that is between about 5-45% of a total formulation amount and the composition also contains a mixture of DMSO and one or more aprotic solvents in ratios that are between about 20/80 to 80/20.

6. The composition of claim 1, further comprising one or more members selected from the group consisting of protic solvents present in the amount of 0.5-15%, surfactants, buffers, fragrance/odor masking agents, colorants, micronutrients, dispersed nitrification inhibitors, dispersed urease inhibitor(s), crystallization inhibitors and flow modifiers.

7. The composition of claim 1, wherein the one or more nitrification inhibitors comprises one or more members selected from the group consisting of 1) dicyandiamide, 2) 2-chloro-6 trichloromethyl)pyridine, 3) 4-amino-1,2,4-6-triazole-HCl, 4) 2,4-diamino-6-trichloromethyltriazine, 5) thiourea, 6) 1-Mercapto-1,2,4-triazole and 2-amino-4-chloro-6-methylpyrimidine, and 7) 3,4 dimethylpyrazole phosphate
  in a formulation wherein nitrification inhibitor(s) is/are present in an amount that is between about 5-45% of a total formulation amount and the formulation also comprises N-(n-butyl) thiophosphoric triamide in an amount that is between about 5-45% of the total formulation amount.

8. The composition of claim 4, wherein the composition is substantially free of water.

9. A fertilizer granule additive or a liquid fertilizer additive, which comprises one or more nitrification inhibitors and one or more urease inhibitors in an organic liquid solvating system comprising a mixture of aprotic solvents
  wherein a first aprotic solvent is dimethyl sulfoxide, dialkyl sulfoxide, diaryl sulfoxide, or an alkylaryl sulfoxide having the formula $R_1\text{—}S(O)\text{—}R_2,$ wherein $R_1$ is methyl, ethyl, n-propyl, phenyl or benzyl and $R_2$ is ethyl, n-propyl, phenyl or benzyl,
  and a second aprotic solvent is one or more members selected from the group consisting of
  1) a $C_1$-$C_{12}$ ester of
    a) an alcohol or polyol from the family of $C_{1-10}$ alkynols and poly($C_{1-10}$ alkylene) glycols,
    b) an alkylene glycol selected from the group consisting of ethylene, propylene, and butylene glycol,
    c) glycerin,
    d) an alkylene glycol alkyl ether selected from the group consisting of dipropylene glycol methyl ether, tripropylene glycol methyl ether, and tripropylene glycol butyl ether;
  wherein the organo liquid solvating system meets the following criteria:
    a. Environmentally safe
    b. Have flashpoint above 145 F
    c. Inherently rated safe for contact with humans and animals
    d. That result in a composition comprising of nitrification and urease inhibitor with a Chill Point <40 F.

10. The fertilizer granule additive or the liquid fertilizer additive of claim 9, wherein the one or more nitrification inhibitors is selected from the group consisting of 1) dicyandiamide, 2) 2-chloro-6 trichloromethyl)pyridine, 3) 4-amino-1,2,4-6-triazole-HCl, 4) 2,4-diamino-6-trichloromethyltriazine, 5) thiourea, 6) 1-mercapto-1,2,4-triazole and 2-amino-4-chloro-6-methylpyrimidine, and 7) 3,4 dimethylpyrazole phosphate.

11. The fertilizer granule additive or the liquid fertilizer additive of claim 9, further comprising one or more urease inhibitors selected from the group consisting of phosphoric triamides, thiophosphoric triamides and alkylated thiophosphoric triamides, wherein the alkylated thiophosphoric triamides has one or more alkyl groups that independently contain between 1 and 6 carbon atoms.

12. The fertilizer granule additive or the liquid fertilizer additive of claim 11, wherein the one or more nitrification inhibitors comprises 1) dicyandiamide, 2) 2-chloro-6 trichloromethyl)pyridine, 3) 4-amino-1,2,4-6-triazole-HCl, 4) 2,4-diamino-6-trichloromethyltriazine, 5) thiourea, 6) 1-mercapto-1,2,4-triazole and 2-Amino-4-chloro-6-methylpyrimidine, or 7) 3,4 dimethylpyrazole phosphate;
  and the one or more urease inhibitors comprises phosphoramides.

13. A method of making a composition to be added to a fertilizer comprising:
  heating a mixture comprising one or more nitrification inhibitors in an organic liquid solvating system comprising a mixture of aprotic solvents
  wherein a first aprotic solvent is dimethyl sulfoxide, dialkyl sulfoxide, diaryl sulfoxide, or an alkylaryl sulfoxide having the formula $R_1\text{—}S(O)\text{—}R_2,$ wherein $R_1$ is methyl, ethyl, n-propyl, phenyl or benzyl and $R_2$ is ethyl, n-propyl, phenyl or benzyl,
  and a second aprotic solvent is one or more members selected from the group consisting of:
  1) a $C_1$-$C_{12}$ ester of
    a) an alcohol or polyol from the family of $C_{1-10}$ alkynols and poly($C_{1-10}$ alkylene) glycols,
    b) an alkylene glycol selected from the group consisting of ethylene, propylene, and butylene glycol,
    c) glycerin,
    d) an alkylene glycol alkyl ethers selected from the group consisting of Dipropylene glycol methyl ether, Tripropylene glycol methyl ether, and Tripropylene glycol butyl ether,
  wherein the organo liquid solvating system meets the following criteria:
    a. Environmentally safe
    b. Have flashpoints above 145 F
    c. Inherently rated safe for contact with humans and animals
    e. That result in a composition comprising of nitrification and urease inhibitor with a chill point <40 F
  cooling the mixture to a temperature that optionally allows an addition of one or more of
  protic solvents present in the amount of 0.5-15%, surfactants, buffers, fragrance/odor masking agents, colorants, micro-nutrients, dispersed nitrification inhibitors, dispersed urease inhibitor(s), crystallization inhibitors and flow modifiers.

14. The method of claim 13, further comprising adding the composition to a fertilizer granule or liquid.

15. The method of claim 13, wherein the one or more nitrification inhibitors is one or more members selected from the group consisting of 1) dicyandiamide, 2) 2-chloro-6 trichloromethyl)pyridine, 3) 4-amino-1,2,4-6-triazole-HCl, 4) 2,4-diamino-6-trichloromethyltriazine, 5) thiourea, 6) 1-mercapto-1,2,4-triazole and 2-amino-4-chloro-6-methylpyrimidine, and 7) 3,4 dimethylpyrazole phosphate.

16. The method of claim 13, further comprising one or more urease inhibitors selected from the group consisting of phosphoric triamides, thiophosphoric triamides and alkylated thiophosphoric triamides, wherein the alkylated thiophosphoric triamides have one or more alkyl groups that independently contain between 1 and 6 carbon atoms.

17. The method of claim 16, wherein the one or more nitrification inhibitors is one or more members selected from the group consisting of 1) dicyandiamide, 2) 2-chloro-6 trichloromethyl)pyridine, 3) 4-amino-1,2,4-6-triazole-HCl, 4) 2,4-diamino-6-trichloromethyltriazine, 5) thiourea, 6) 1-mercapto-1,2,4-triazole and 2-amino-4-chloro-6-methyl-pyrimidine, and 7) 3,4 dimethylpyrazole phosphate and the one or more urease inhibitors comprises phosphoramides.

18. The method of claim 13, wherein the composition is substantially free of water.

\* \* \* \* \*